US008657365B2

(12) United States Patent
Amano et al.

(10) Patent No.: US 8,657,365 B2
(45) Date of Patent: Feb. 25, 2014

(54) VEHICLE BODY FRONT STRUCTURE OF ELECTRIC VEHICLE

(71) Applicant: Honda Motor Co., Ltd., Tokyo (JP)

(72) Inventors: Atsushi Amano, Wako (JP); Ryuta Wakabayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/666,972

(22) Filed: Nov. 2, 2012

(65) Prior Publication Data

US 2013/0119704 A1    May 16, 2013

(30) Foreign Application Priority Data

Nov. 14, 2011    (JP) ................................. 2011-248171

(51) Int. Cl.
*B60J 7/00*    (2006.01)

(52) U.S. Cl.
USPC ..................................................... 296/187.11

(58) Field of Classification Search
USPC ................. 296/187.11, 187.08, 193.07, 37.1, 296/187.09
See application file for complete search history.

(56) References Cited

U.S. PATENT DOCUMENTS

| | | | | | |
|---|---|---|---|---|---|
| 4,267,895 | A | * | 5/1981 | Eggert, Jr. ..................... | 180/68.1 |
| 4,501,129 | A | * | 2/1985 | Charles ........................... | 62/239 |
| 4,840,423 | A | * | 6/1989 | Maekawa ................... | 296/203.02 |
| 5,271,473 | A | * | 12/1993 | Ikeda et al. .................. | 180/68.4 |
| 6,769,733 | B2 | * | 8/2004 | Seksaria et al. .............. | 296/192 |
| 6,779,622 | B2 | * | 8/2004 | Mizorogi ..................... | 180/297 |
| 6,899,195 | B2 | * | 5/2005 | Miyasaka ..................... | 180/312 |
| 6,908,128 | B2 | * | 6/2005 | Strong ........................... | 293/128 |
| 7,219,954 | B2 | * | 5/2007 | Gomi et al. ............... | 296/203.02 |
| 7,267,394 | B1 | * | 9/2007 | Mouch et al. ............. | 296/203.02 |
| 7,464,782 | B2 | * | 12/2008 | Hirakawa et al. .......... | 180/89.12 |
| 7,469,956 | B2 | * | 12/2008 | Yasuhara et al. ......... | 296/187.09 |
| 7,556,310 | B2 | * | 7/2009 | Miki ............................. | 296/204 |
| 7,766,420 | B2 | * | 8/2010 | Maruyama et al. ...... | 296/203.02 |
| 7,810,878 | B2 | * | 10/2010 | Nakamura et al. ........ | 296/203.02 |
| 7,900,963 | B2 | * | 3/2011 | Jolley ........................... | 280/781 |
| 8,152,224 | B2 | * | 4/2012 | Faruque et al. .......... | 296/187.09 |
| 8,256,831 | B2 | * | 9/2012 | Abe et al. .................. | 296/203.02 |
| 8,398,153 | B1 | * | 3/2013 | Dandekar et al. ........ | 296/187.09 |
| 2001/0054831 | A1 | * | 12/2001 | Akasaka ....................... | 296/188 |
| 2003/0025358 | A1 | * | 2/2003 | Taguchi et al. ........... | 296/203.02 |
| 2005/0236827 | A1 | * | 10/2005 | Mouch et al. ................. | 280/788 |
| 2008/0067838 | A1 | * | 3/2008 | Nakamae et al. .......... | 296/203.02 |
| 2008/0157547 | A1 | * | 7/2008 | Baumann et al. ............. | 293/118 |
| 2009/0140546 | A1 | * | 6/2009 | Okabe et al. ............. | 296/187.09 |
| 2012/0248820 | A1 | * | 10/2012 | Yasui et al. .............. | 296/187.09 |

FOREIGN PATENT DOCUMENTS

JP    2011-20627    2/2011

* cited by examiner

*Primary Examiner* — Kiran B Patel

(74) *Attorney, Agent, or Firm* — Ditthavong Mori & Steiner, P.C.

(57) ABSTRACT

A vehicle body front structure of an electric vehicle includes a first side frame, a second side frame, a unit frame, and a bending inducing bracket. The unit frame includes a rear frame portion. The bending inducing bracket is provided in a substantially central area of the rear frame portion and protrudes from the rear frame portion toward a rear of the electric vehicle. The bending inducing bracket is spaced apart from a wall member of a vehicle cabin in a front-rear direction. The bending inducing bracket is provided to come into contact with the wall member when an impact load is input from a front side of the electric vehicle.

5 Claims, 8 Drawing Sheets

VEHICLE BODY FRONT STRUCTURE OF ELECTRIC VEHICLE

CROSS-REFERENCE TO RELATED APPLICATIONS

The present application claims priority under 35 U.S.C. §119 to Japanese Patent Application No. 2011-248171, filed Nov. 14, 2011, entitled "Vehicle Body Front Structure of Electric Vehicle". The contents of this application are incorporated herein by reference in their entirety.

BACKGROUND OF THE INVENTION

1. Field of the Invention

The present application relates to a vehicle body front structure of an electric vehicle.

2. Discussion of the Background

In a motor compartment of an electric vehicle, a pair of side frames extending in the front-rear directions of the vehicle are provided on both sides in the vehicle width direction. Electrical components such as a DC-DC converter and an inverter and a drive motor that drives the vehicle are disposed between the pair of side frames using a dedicated frame member (see, for example, Japanese Unexamined Patent Application Publication No. 2011-20627).

A vehicle body front structure disclosed in Japanese Unexamined Patent Application Publication No. 2011-20627 has a component mounting frame, on which the DC-DC converter and the inverter are mounted. The component mounting frame is connected to side frames on the left and right in the vehicle width direction on a front end side and a rear end side.

SUMMARY OF THE INVENTION

According to one aspect of the present invention, a vehicle body front structure of an electric vehicle includes a first side frame, a second side frame, a unit frame, and a bending inducing bracket. The first side frame is provided on a first side of a motor compartment in a vehicle width direction of the electric vehicle. The first side frame includes a first curved portion curved substantially upward from a lower front side of a vehicle cabin of the electric vehicle toward a front side of a vehicle body of the electric vehicle. The second side frame is provided on a second side of the motor compartment in the vehicle width direction. The second side frame includes a second curved portion curved substantially upward from the lower front side of the vehicle cabin toward the front side of the vehicle body. The unit frame is provided between the first and second side frames to hold an electrical device including a plurality of electrical components housed in a unit case. The unit frame includes a first longitudinal frame portion, a second longitudinal frame portion, a first front side support leg, a second front side support leg, a rear frame portion, a first rear side support leg, a second rear side support leg, a first branch portion, and a second branch portion. The first longitudinal frame portion extends in a front-rear direction of the electric vehicle and is provided on a first side of the electrical device in the vehicle width direction. The first longitudinal frame portion is secured to a first side portion of the electrical device. The second longitudinal frame portion extends in the front-rear direction and is provided on a second side of the electrical device in the vehicle width direction. The second longitudinal frame portion is secured to a second side portion of the electrical device. The second side portion of the electrical device is opposite to the first side portion of the electrical device in the vehicle width direction. The first front side support leg downwardly extends from a front end portion of the first longitudinal frame portion. The first front side support leg is secured to the first side frame at a position located further forward than the first curved portion of the first side frame. The second front side support leg downwardly extends from a front end portion of the second longitudinal frame portion. The second front side support leg is secured to the second side frame at a position located further forward than the second curved portion of the second side frame. The rear frame portion extends in the vehicle width direction and is disposed on a rear side of the electrical device. The rear frame portion includes a substantially central area positioned higher than an upper surface of a rear edge portion of the electrical device. The first rear side support leg downwardly extends from a first end portion of the rear frame portion and is secured to the first side frame. The second rear side support leg downwardly extends from a second end portion of the rear frame portion and is secured to the second side frame. The second end portion of the rear frame portion is opposite to the first end portion of the rear frame portion in the vehicle width direction. The first branch portion connects a rear end portion of the first longitudinal frame portion to the first rear side support leg at a substantially middle area of the first rear side support leg in a top-bottom direction of the electric vehicle. The second branch portion connects a rear end portion of the second longitudinal frame portion to the second rear side support leg at a substantially middle area of the second rear side support leg in the top-bottom direction. The bending inducing bracket is provided in the substantially central area of the rear frame portion and protrudes from the rear frame portion toward a rear of the electric vehicle. The bending inducing bracket is spaced apart from a wall member of the vehicle cabin in the front-rear direction. The bending inducing bracket is provided to come into contact with the wall member when an impact load is input from a front side of the electric vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
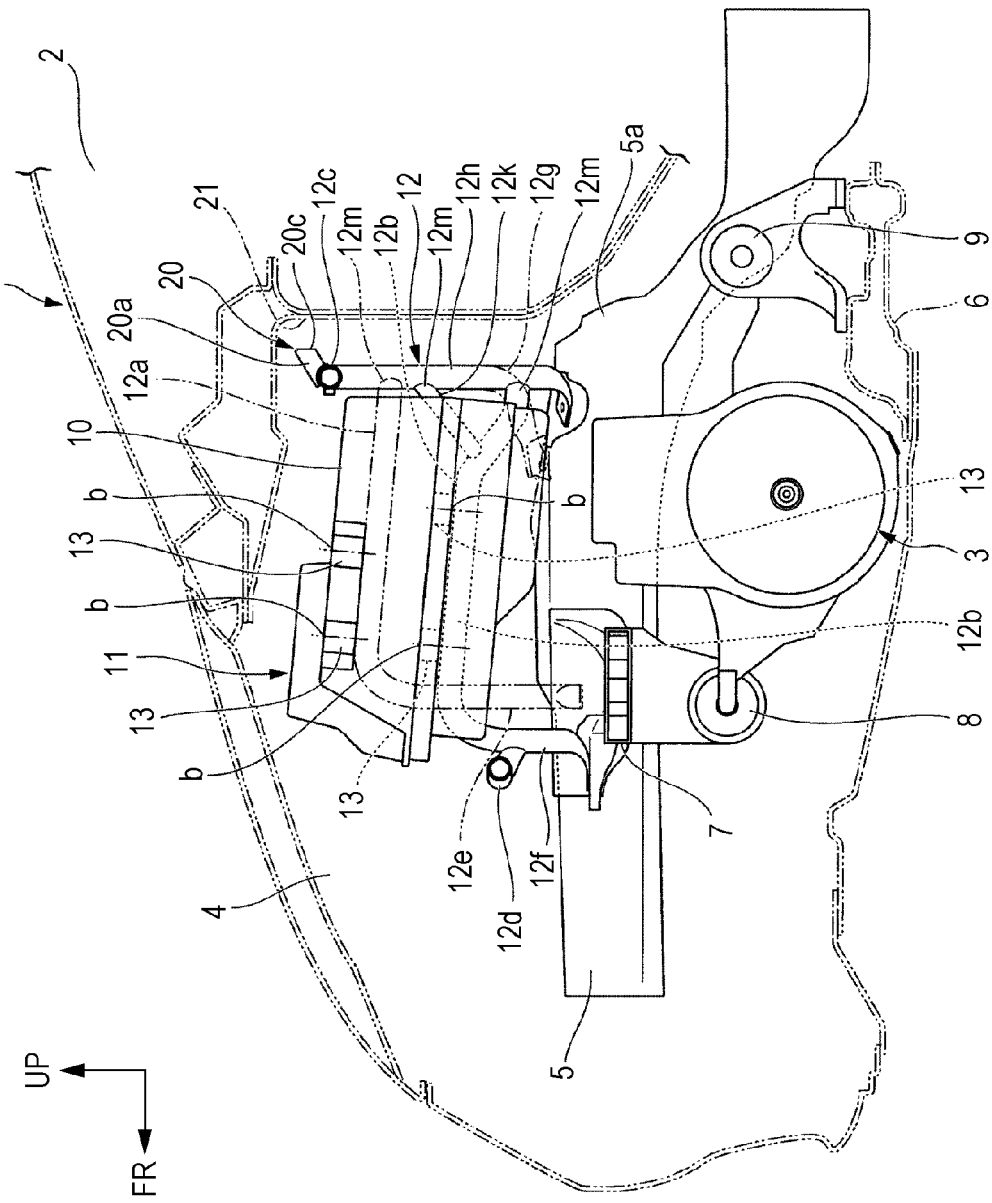
FIG. 1 is a schematic sectional view of an electric vehicle according to an embodiment of the present application taken along line I-I in FIG. 2.

The embodiments will now be described with reference to the accompanying drawings, wherein like reference numerals designate corresponding or identical elements throughout the various drawings.

In the drawings referred to below, an arrow FR indicates a direction toward the front of a vehicle and an arrow UP indicates a direction toward the top of the vehicle. Also in description below, front (forward), rear, top (up, upper), bottom (down, lower), and the like refer to the front (forward), rear, top (up, upper), bottom (down, lower), and the like with respect to the vehicle unless otherwise specified.

Figure 2:
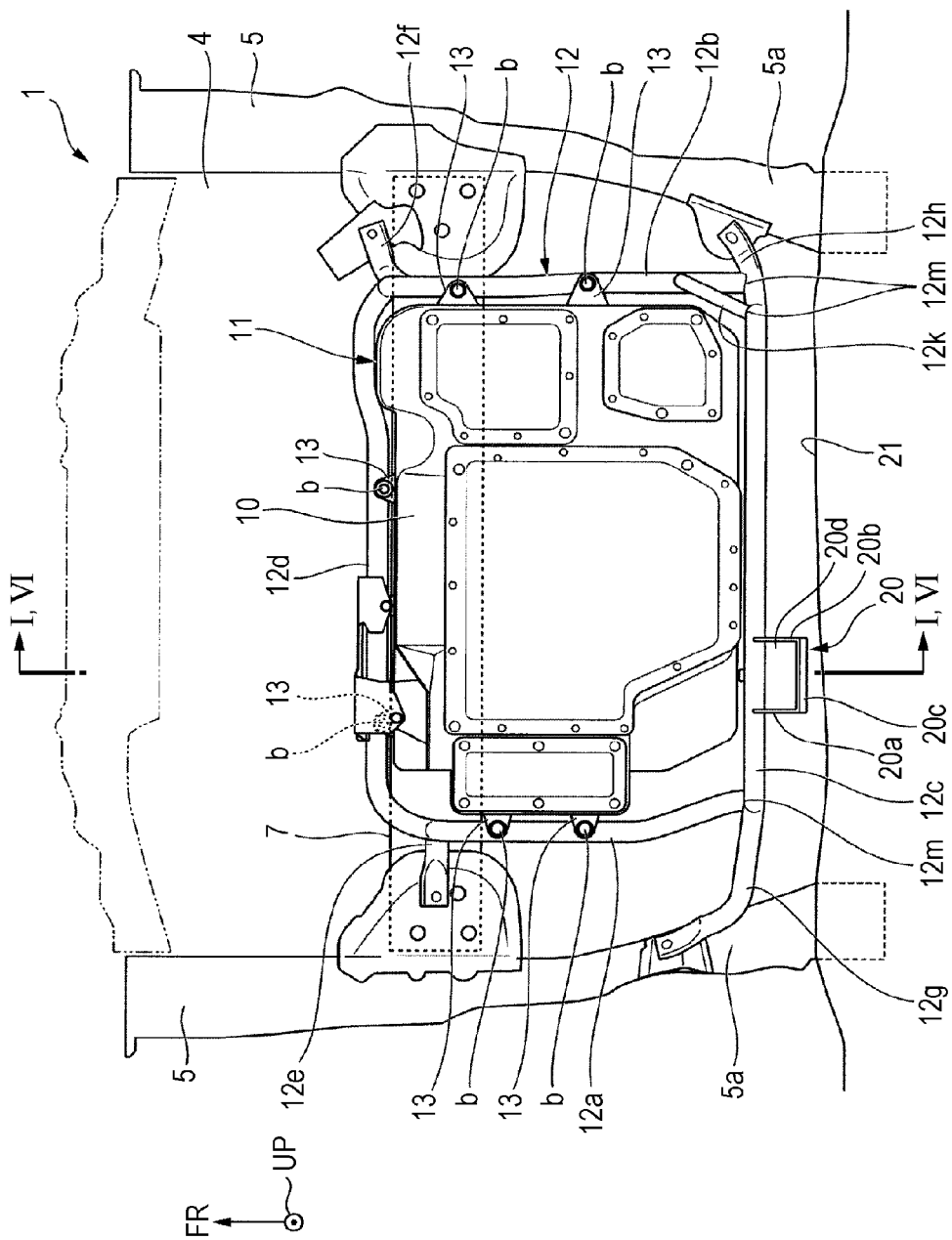
FIG. 2 is a schematic plan view of a motor compartment of the electric vehicle according to the embodiment of the present application.

FIG. 1 is a longitudinal sectional view of a front side of a vehicle body of an electric vehicle 1 according to the present embodiment. FIG. 2 is a plan view of a front portion of the vehicle body of the electric vehicle 1.

The electric vehicle 1 has a motor compartment 4 in front of a vehicle cabin 2. The motor compartment 4 houses a drive motor 3. In addition to the drive motor 3, the motor compartment 4 also houses components, which are not shown, such as suspension components on a front wheel side, electrical components, and auxiliary equipment. The drive motor 3 of the present embodiment is a motor unit, which includes a motor main body and a deceleration mechanism integrated with each other.

A pair of side frames 5 are provided on both sides of the motor compartment 4 in the vehicle width direction. Each of the pair of side frames 5 is curved substantially upward from a lower side of a front portion of the vehicle cabin 2 so as to extend toward the front of the vehicle body. The drive motor 3 is disposed between the pair of side frames 5. A rear end portion of each side frame 5 is connected to frame members in a longitudinally central portion of the vehicle body such as floor frame and a side sill, which are not shown. A subframe 6 serving as a rear side cross beam member is disposed in the vehicle width direction in root sides (near curved portions 5a) of the side frames 5 near the vehicle cabin 2 between both the side frames 5. A front beam 7 serving as a front side cross beam member is disposed in the vehicle width direction in portions located further forward than the curved portions 5a of the side frames 5 between the both side frames 5. The subframe 6 and the front beam 7, which are disposed between both the side frames 5 as described above, are located such that the front beam 7 side is positioned higher than the subframe 6 side in the top-bottom direction of the vehicle.

Front and rear end portions on each of the left and right sides of the subframe 6 are connected to two positions on a lower surface of a corresponding one of the left and right side frames 5, the two positions being spaced apart from each other in the front-rear direction. Lower arms for front wheels, which are not shown, are each swingably supported in a space between the front and rear connection portions on the left or right side. The front beam 7 is defined by a hollow frame having a rectangular section. Each end portion of the front beam 7 is connected to a lower edge portion of a corresponding one of the side frames 5.

The above-described drive motor 3 is disposed between the front beam 7 and the subframe 6. A front end side of the drive motor 3 is connected to a lower surface of the front beam 7 through a mount member 8 having a rubber vibration isolator, and a rear end side of the drive motor 3 is connected to an upper surface of the subframe 6 through a mount member 9 similar to the mount member 8. Thus, the drive motor 3 is supported by the front beam 7 and the subframe 6 through the mount members 8 and 9.

The front beam 7 and an upper end area of the drive motor 3, which is supported as described above by the front beam 7 and the subframe 6, are superposed on each other in the top-bottom direction seen from the front of the vehicle, and a lower end area of the drive motor 3 and the subframe 6 are superposed on each other in the top-bottom direction seen from the front of the vehicle.

An electrical unit 11, which includes a plurality of high-voltage electrical components housed in a unit case 10, the high-voltage electrical components including power modules having the functions of a DC-DC converter and an inverter and a smoothing capacitor, is provided at a position substantially immediately above the drive motor 3 in the motor compartment 4. The electrical unit 11 (unit case 10) is formed to have a substantially box-like shape elongated in the vehicle width direction and secured to the left and right side frames 5 through a unit frame 12, which holds the electrical unit 11. The unit frame 12 in the present embodiment is formed by connecting a plurality of metal pipes to one another.

Figure 3:
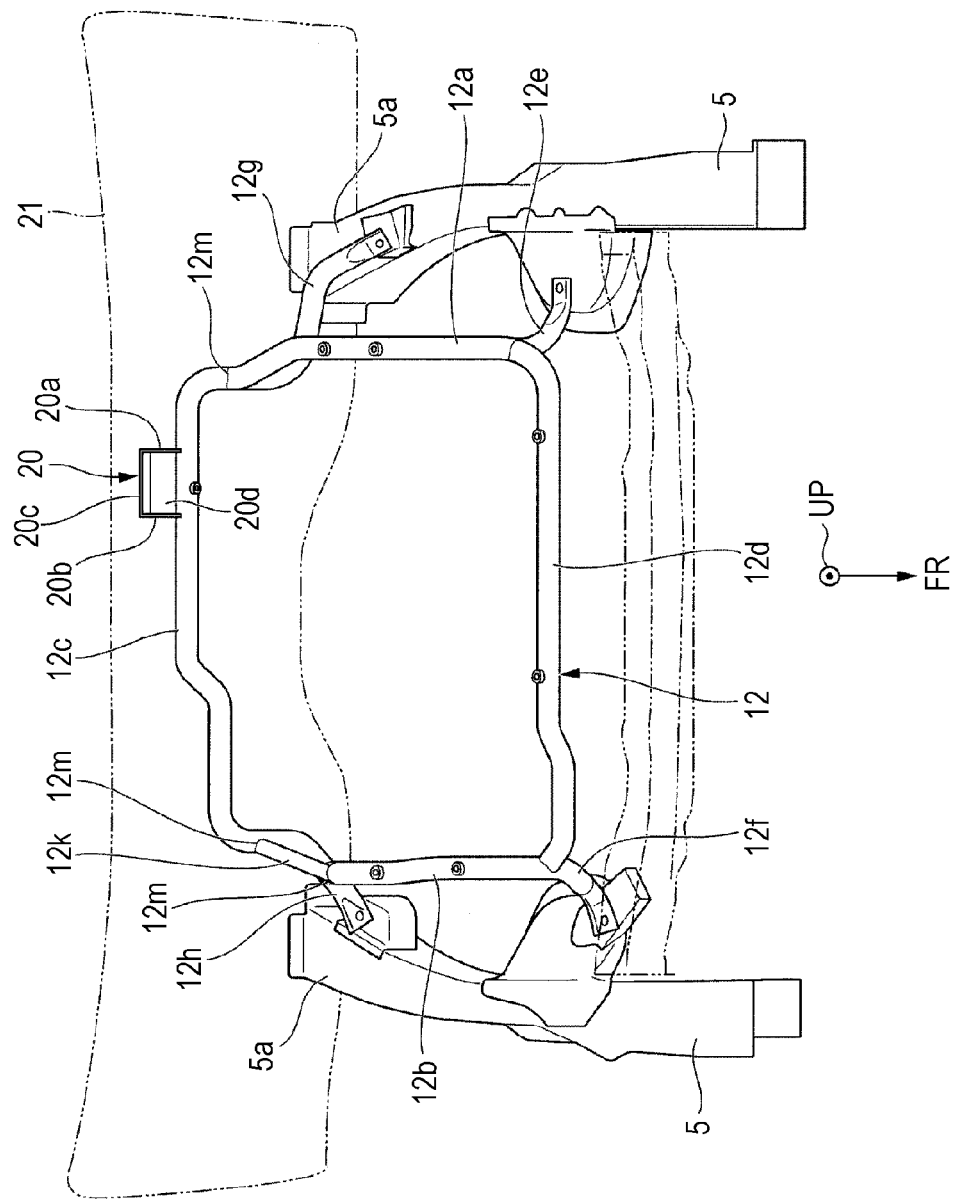
FIG. 3 is a schematic perspective view of a frame structure of the motor compartment of the electric vehicle according to the embodiment of the present application seen from a diagonally upper side on the front side.
Figure 4:
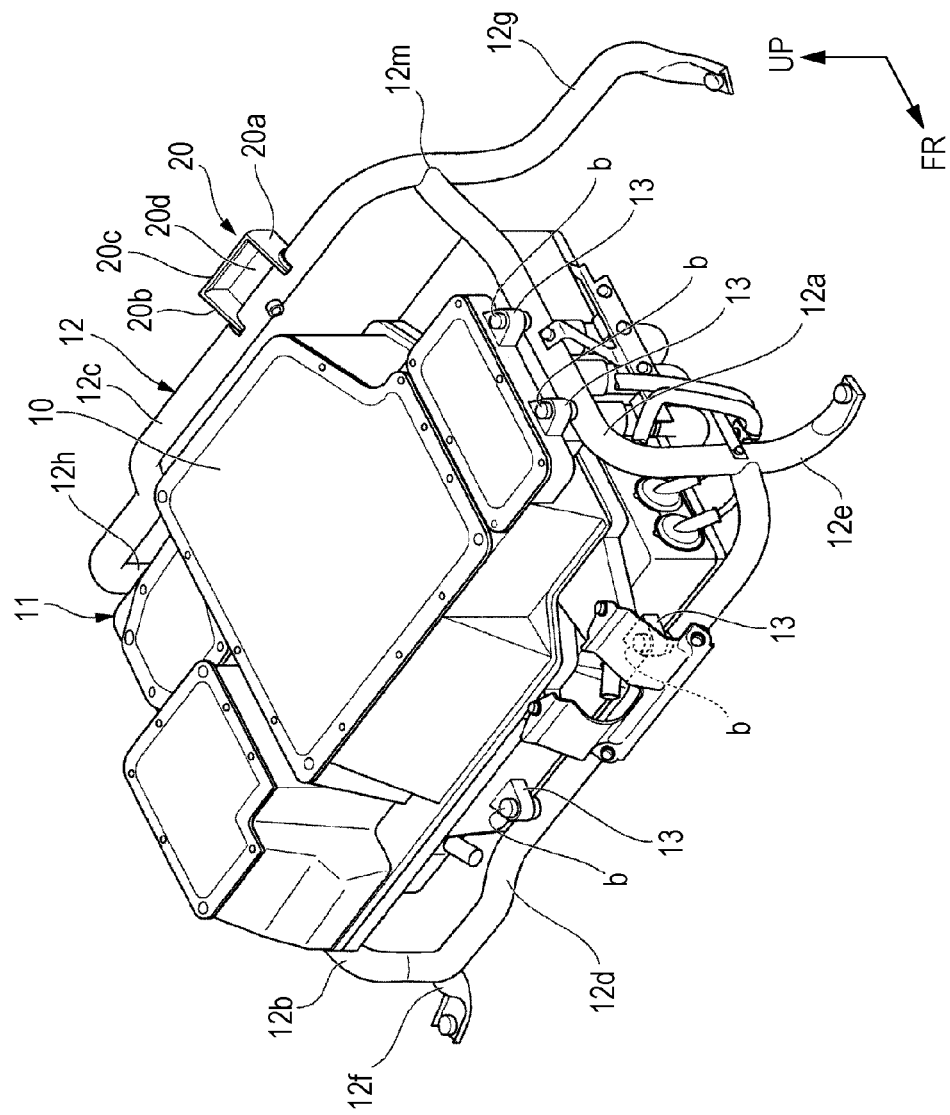
FIG. 4 is a perspective view of a unit frame and an electrical unit of the electric vehicle according to the embodiment of the present application seen from a diagonally upper side on the left side of the electric vehicle.
Figure 5:
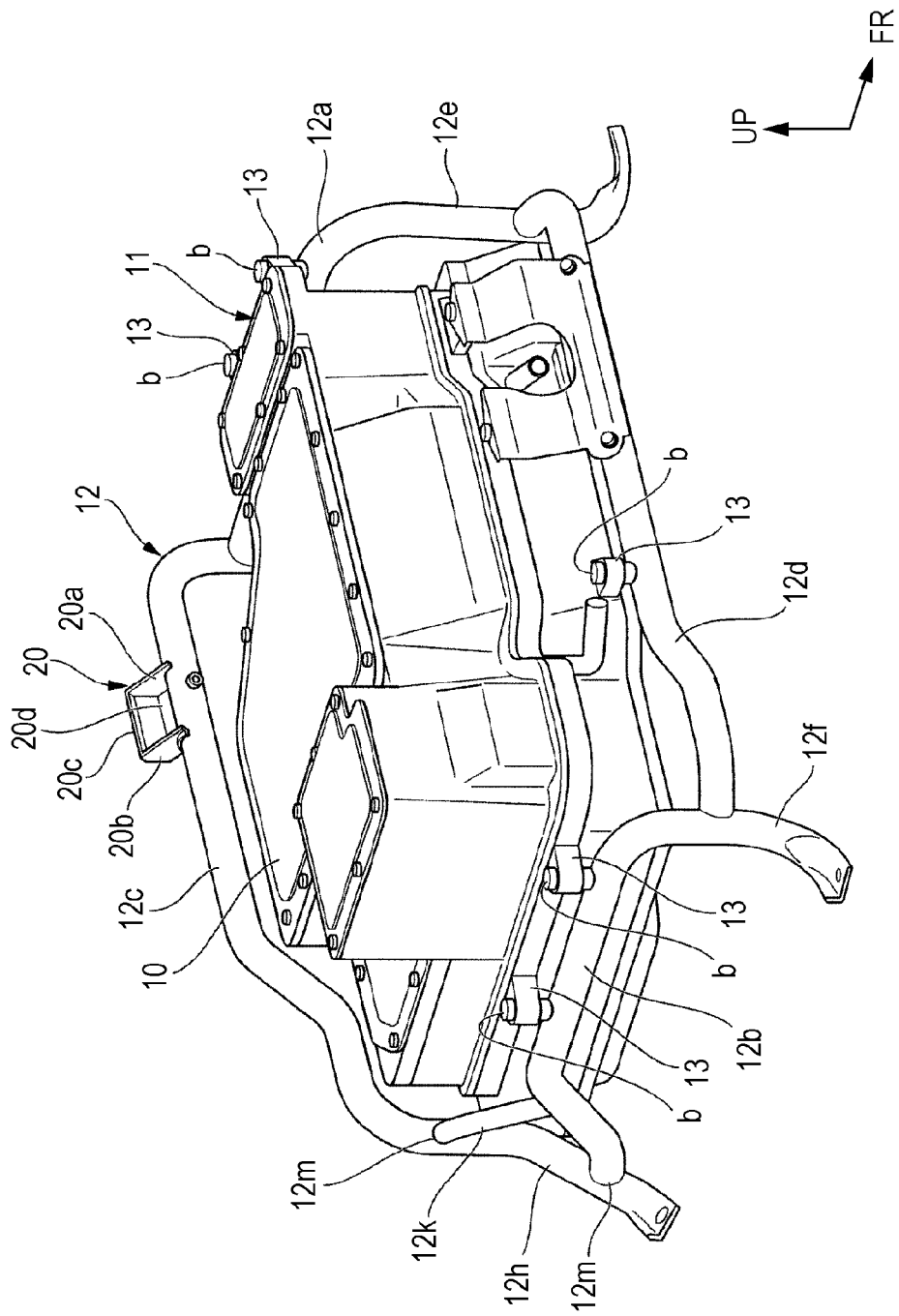
FIG. 5 is a perspective view of the unit frame and the electrical unit of the electric vehicle according to the embodiment of the present application seen from a diagonally upper side on the right side of the electric vehicle.
Figure 6:
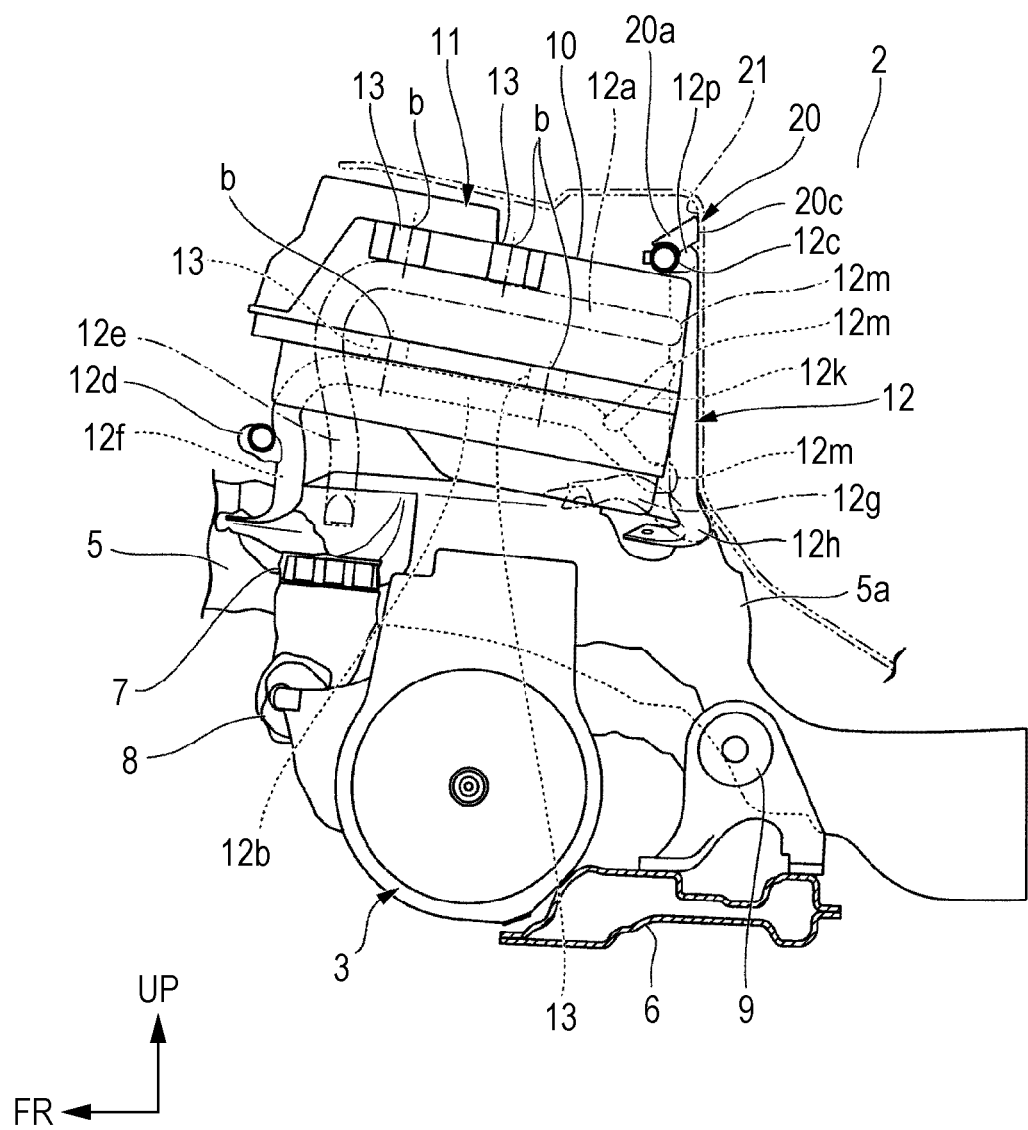
FIG. 6 is a schematic sectional view of the electric vehicle according to the embodiment of the present application taken along line VI-VI in FIG. 2 when an impact load is input.

FIG. 3 illustrates a state in which the unit frame 12 and the side frames 5 are connected to one another. FIGS. 5 and 6 illustrate the electrical unit 11 with the unit frame 12.

The unit frame 12 includes a pair of longitudinal frame portions 12a and 12b, a rear frame portion 12c, and a front frame portion 12d. The longitudinal frame portions 12a and 12b extend in the front-rear direction of the vehicle body on both sides of the electrical unit 11 in the vehicle width direction. The rear frame portion 12c extends in the vehicle width direction on the rear side of the electrical unit 11. The front frame portion 12d extends in the vehicle width direction on the front side of the electrical unit 11. Front side support legs 12e and 12f respectively extend from front end portions of the longitudinal frame portions 12a and 12b disposed on the corresponding sides. The front side support legs 12e and 12f are each curved downward so as to be connected to an area located further forward than the curved portion 5a of a corresponding one (on the same left or right side with respect to the vehicle width direction) of the side frames 5. Left and right end portions of the front frame portion 12d are respectively connected to the middle areas of the front side support legs 12e and 12f in the top-bottom direction.

Rear side support legs 12g and 12h extend from both end portions of the rear frame portion 12c. The rear side support legs 12g and 12h are each curved downward so as to be connected to an area near the curved portion 5a of a corresponding one of the side frames 5. Rear end portions of the longitudinal frame portions 12a and 12b are respectively connected to the middle areas of the rear side support legs 12g and 12h in the top-bottom direction. Portions of the rear side support legs 12g and 12h where the rear side support legs 12g and 12h are connected to the respective longitudinal frame portions 12a and 12b are referred to as branch portions 12m. The rear side support leg 12h, which is positioned on the right side in the vehicle width direction, is connected to the longitudinal frame portion 12b at top and bottom two positions. An additional separate sub-pipe 12k is used for the connection with one of the positions. Thus, two branch portions 12m exist, one branch portion 12m existing at the top and the other branch portion 12m existing at the bottom, on the right side in the vehicle width direction.

The unit case 10 has fastening flanges 13, which protrude from both side portions and a front portion thereof. The fastening flanges 13 are each superposed on upper portions of the unit frame 12 so as to be secured with bolts. Specifically, the fastening flanges 13 on both the side portions of the unit case 10 are secured to upper surfaces of the longitudinal frame portions 12a and 12b with bolts, and the fastening flanges 13 on the front portion of the unit case 10 are secured to an upper surface of the front frame portion 12d with bolts. Reference sign b in the drawings denotes the bolts that secure the fastening flanges 13.

The rear frame portion 12c is not secured to the unit case 10 of the electrical unit 11.

The rear frame portion 12c is disposed on the rear side of the unit case 10 of the electrical unit 11 such that at least a central area of the rear frame portion 12c in the vehicle width direction is positioned higher than an upper surface of a rear edge of the unit case 10. A bending inducing bracket 20, which diagonally upwardly protrudes toward the rear side of the vehicle, is mounted in the central area of the rear frame portion 12c.

The bending inducing bracket 20 includes a pair of side plate portions 20a and 20b, an end plate portion 20c, and a reinforcement plate portion 20d. The side plate portions 20a and 20b diagonally upwardly protrude toward the rear side of the vehicle so as to be substantially perpendicular to the axis of the rear frame portion 12c from two positions spaced apart in the axial direction of the rear frame portion 12c. The end plate portion 20c connects protruding ends of the side plate portions 20a and 20b to each other. The reinforcement plate portion 20d connects the side plate portions 20a and 20b on both sides and the end plate portion 20c to one another at the lower end side. The end plate portion 20c of the bending inducing bracket 20 opposes a front surface of a dashboard 21, which is a wall member on the vehicle cabin side, with a gap set therebetween.

Figure 7:
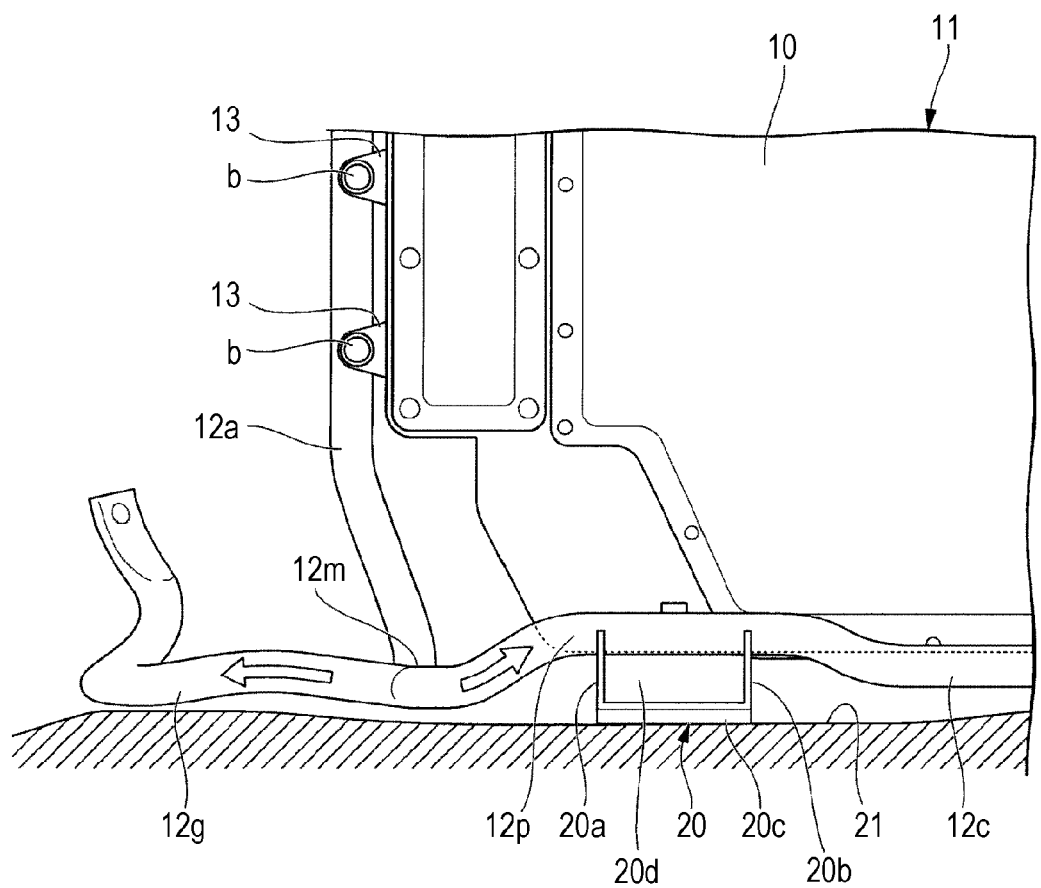
FIG. 7 is a schematic plan view of part of the motor compartment of the electric vehicle according to the embodiment of the present application when an impact load is input.
Figure 8A:
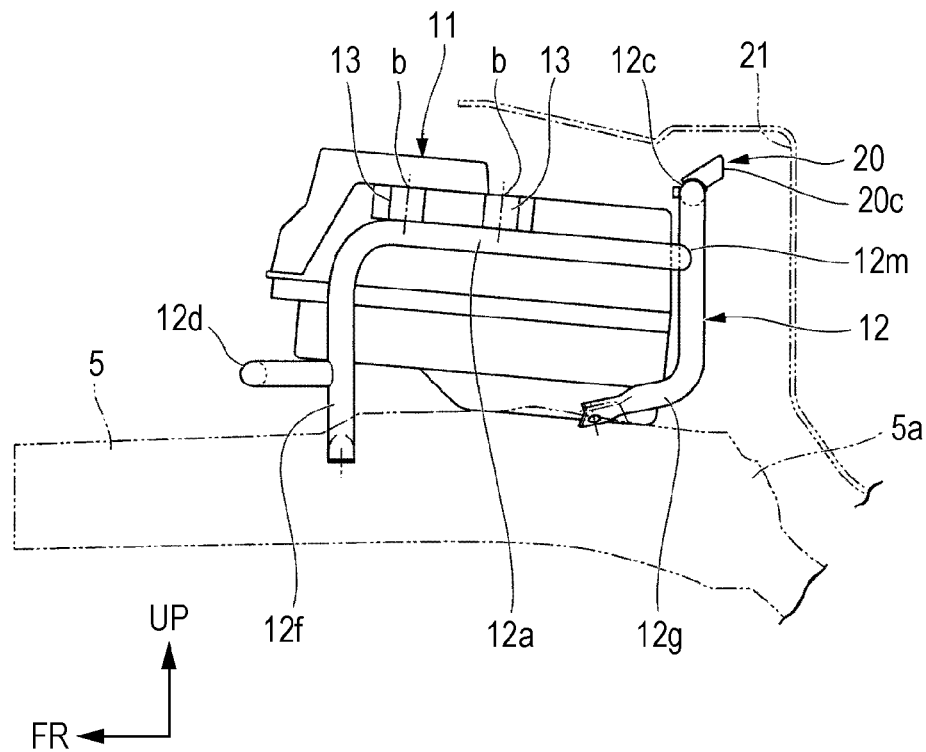
FIGS. 8A and 8B are schematic side views of the electric vehicle according to the embodiment of the present application respectively illustrate a state in which an impact load has not been input and a state in which an impact load has been input.
Figure 8B:
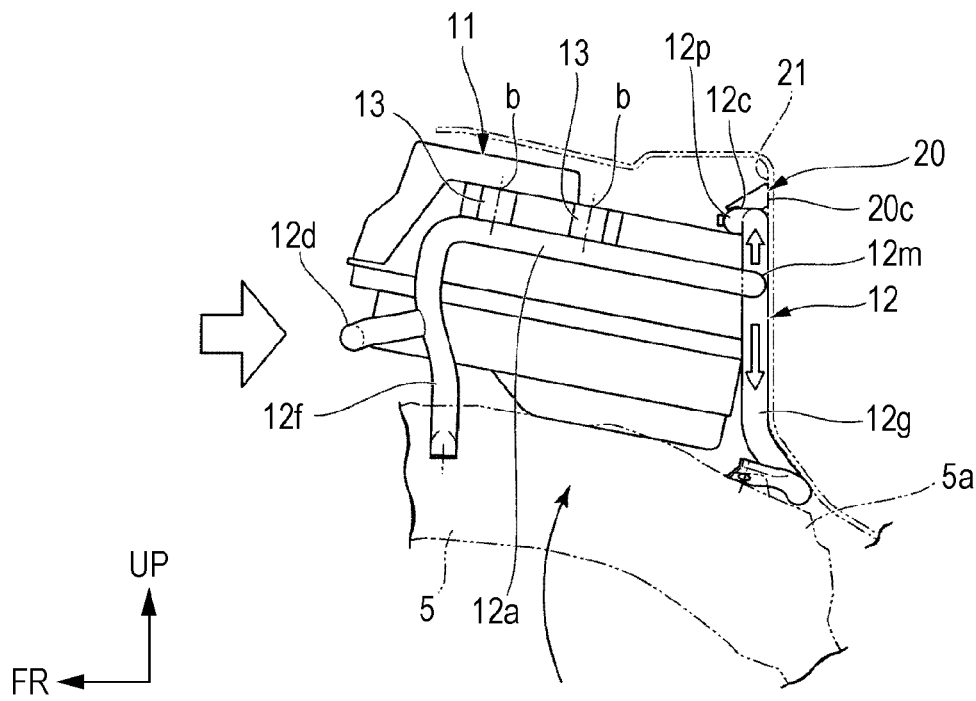

FIG. 6 is a sectional view illustrating deformation behaviors in the motor compartment 4 when an impact load is input from the front side of the vehicle. FIG. 7 is a plan view illustrating the deformation behavior of the unit frame 12 when an impact load is input from the front side of the vehicle. FIGS. 8A and 8B are schematic side views respectively illustrate a state in which an impact load has not been input and a state in which an impact load has been input.

As illustrated in FIGS. 6 to 8B, when the unit frame 12 is displaced rearward by an impact load input from the front side of the vehicle, the end plate portion 20c of the bending inducing bracket 20 is brought into contact with the front surface of the dashboard 21. At this time, the bending inducing bracket 20 receives a large reaction force from the front surface of the dashboard 21, thereby causing the central area of the rear frame portion 12c to be bent toward the front side of the vehicle. Reference sign 12p in FIG. 7 denotes a recess in the rear frame portion 12c formed in a process as described above.

A reinforcement member (not shown) having a high strength is joined to an area of the dashboard 21 to be in contact with the bending inducing bracket 20.

Next, deformation behaviors in the motor compartment 4 occurring when an impact load is input from the front of the vehicle are described.

When an impact load is input to the electric vehicle 1 from the front side thereof, the side frames 5 in the motor compartment 4 are pressed from the front end side thereof, thereby causing the front areas thereof to be crushed rearward. At this time, the impact load input to the upper end area of the drive motor 3 through the front beam 7 together with a reaction force acts as a moment urging the entire drive motor 3 to rotate upward. The reaction force is applied through the subframe 6 in contact with the lower end area of the drive motor 3. The moment acting on the drive motor 3 urges the area of each side frame 5 located further forward than the curved portion 5a to rotate about the root side of the side frame 5 so as to be displaced upward. As a result, the area of each side frame 5 located further forward than the curved portion 5a is, as illustrated in FIG. 6, moved upward while being crushed rearward.

At this time, the electrical unit 11 secured to the side frames 5 through the unit frame 12 is, as the side frames 5 deform, moved upward while being displaced toward the rear side of the vehicle. When the electrical unit 11 and the unit frame 12 are displaced toward the rear side of the vehicle as described above, as illustrated in FIG. 8B, the end plate portion 20c of the bending inducing bracket 20 attached to the rear frame portion 12c of the unit frame 12 is brought into contact with the dashboard 21, and with further rearward displacement, the recess 12p is formed in the central area of the rear frame portion 12c in a manner as described above and brought into contact with the upper surface of the rear edge of the electrical unit 11 (unit case 10).

When the areas of the side frames 5 located further forward than the curved portions 5a rotate about the respective root sides of the side frame 5 so as to be displaced upward as described above, the front side support legs 12e and 12f of the unit frame 12 are moved upward together with the front side areas of the side frames 5 while the rear side support legs 12g and 12h of the unit frame 12 remain at a lower position together with the root sides of the side frames 5. Accordingly, at this time, downward pulling forces as indicated by a downward hollow arrow in FIG. 8B relatively act on lower ends of the rear side support legs 12g and 12h of the unit frame 12.

At this time, the above-described recess 12p is formed in the rear frame portion 12c of the unit frame 12 due to contact of the bending inducing bracket 20 with the dashboard 21, and after that, the recess 12p is brought into contact with the upper surface of the rear edge of the electrical unit 11. Thus, as indicated by an upward hollow arrow in FIG. 8B, upward reaction forces act on upper portions of the rear side support legs 12g and 12h against the above-described downward pulling forces. For this reason, large pulling loads do not suddenly act on the branch portions 12m on the rear side support legs 12g and 12h at this time.

Thus, in the vehicle body front structure according to the present embodiment, when an impact load is input from the front side of the vehicle, large pulling loads can be prevented from suddenly acting on the branch portions 12m on the rear side support legs 12g and 12h of the unit frame 12. Accordingly, the pulling loads can be prevented from acting as forces applied through the branch portions 12m on a securing portions, at which the longitudinal frame portions 12a and 12b and the side portions (fastening flanges 13) of the electrical unit 11 are secured to one another, in a direction in which the longitudinal frame portions 12a and 12b and the side portions of the electrical unit 11 are separated from one another.

Thus, when this vehicle body front structure is used, even when an impact load is input, a state in which the electrical unit 11 and the unit frame 12 are connected to each other can be stably maintained.

In the vehicle body front structure according to the present embodiment, the longitudinal frame portions 12a and 12b of the unit frame 12 and the front frame portion 12d of the unit frame 12 are secured with bolts to the side portions on the both sides of the electrical unit 11 and the front portion of the electrical unit 11 while the rear frame portion 12c of the unit frame 12 is not secured to the electrical unit 11. Thus, there is an advantage in that, when an impact load is input from the front, the rear frame portion 12c can be more easily deformed forward using the bending inducing bracket 20.

The present application is not limited to the aforementioned embodiment. A variety of design modifications are possible without departing from the gist of the present application.

According to an aspect of the embodiment, a vehicle body front structure of an electric vehicle allows an electrical unit (for example, the electrical unit 11 of the embodiment) containing a plurality of electrical components housed in a unit case (for example, the unit case 10 of the embodiment) to be disposed in a motor compartment (for example, the motor compartment 4 of the embodiment) in front of a vehicle cabin. The vehicle body front structure includes a pair of side frames (for example, the side frames 5 of the embodiment) that are provided on both sides of the motor compartment in a vehicle width direction, curved upward from a lower front side of the vehicle cabin so as to extend toward the front of a vehicle body. The vehicle body front structure also includes a unit frame (for example, the unit frame 12 of the embodiment) that is provided between the pair of side frames and holds the electrical unit. The unit frame includes a pair of longitudinal frame portions (for example, the longitudinal frame portions 12a and 12b of the embodiment), front side support legs (for example, the front side support legs 12e and 12f of the embodiment), a rear frame portion (for example, the rear frame portion 12c of the embodiment), rear side support legs (for example, the rear side support legs 12g and 12h of the embodiment), and branch portions (for example, the branch portions 12m of the embodiment). The pair of longitudinal frame portions extend in a front-rear direction of the vehicle body on both sides of the electrical unit in the vehicle width direction and are secured to corresponding side portions of the electrical unit. The front side support legs each downwardly extend from a front end portion of a corresponding one of the longitudinal frame portions and are each secured to a portion of a corresponding one of the side frames, the portion being located further forward than the upwardly extending portion of the corresponding side frame. The rear frame portion extends in the vehicle width direction and is disposed on a rear side of the electrical unit such that at least a central area thereof is positioned higher than an upper surface of a rear edge portion of the electrical unit. The rear side support legs each downwardly extend from a corresponding one of end portions of the rear frame portion and are each secured to the root side of a corresponding one of the side frames. In the branch portions, rear end portions of the longitudinal frame portions are connected to the corresponding rear side support legs at middle areas of the rear side support legs in a top-bottom direction. In the vehicle body front structure, a bending inducing bracket (for example, the bending inducing bracket 20 of the embodiment) is provided in a central area of the rear frame portion. The bending inducing bracket protrudes toward a rear side of the vehicle, and a protruding end side of the bending inducing bracket is brought into contact with a wall member (for example, the dashboard 21 of the embodiment) on the vehicle cabin side when an impact load is input from a front side.

According to the aspect of the embodiment, with the above-described structure, when an impact load is input from the front of the vehicle, portions of the side frames located further forward than the upwardly extending portions are crushed rearward and moved upward, and the electrical unit and the unit frame are displaced toward the rear side of the vehicle, thereby causing the protruding end side of the bending inducing bracket to be brought into contact with the wall member on the vehicle cabin side. At this time, a reaction force input to the bending inducing bracket causes the central area of the rear frame portion to be bent toward the front of the vehicle. The recess thus formed in the rear frame portion is brought into contact with the upper surface of the rear edge portion of the electrical unit. As a result, the front edge portion sides of the side frames are moved upward while the root sides of the side frames remain at a lower position. Thus, even when lower ends of the rear side support legs of the unit frame are relatively pulled downward, the recess of the rear frame portion is held by the upper surface of the electrical unit. Thus, a situation in which the branch portions where the longitudinal frame portions are connected to the rear side support legs are pulled downward is suppressed. This can reliably prevent the side portions of the electrical unit and the longitudinal frame portions, which are secured to one another at the securing portions, from being separated from one another.

The unit frame of the embodiment may further include a front frame portion (for example, the front frame portion 12d of the embodiment) that extends in the vehicle width direction on a front side of the electrical unit. In this case, ends of the front frame portion are connected to the corresponding front side support legs. In this case, in the vehicle body front structure of the embodiment, the electrical unit is secured to the front frame portion on the front side thereof and is not secured to the rear frame portion on the rear side thereof.

Thus, when an impact load is input from the front and the bending inducing bracket of the embodiment is brought into contact with the wall member on the vehicle cabin side, the rear frame portion can be more easily deformed forward.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle body front structure of an electric vehicle, comprising:

a first side frame provided on a first side of a motor compartment in a vehicle width direction of the electric vehicle, the first side frame including a first curved portion curved substantially upward from a lower front side of a vehicle cabin of the electric vehicle toward a front side of a vehicle body of the electric vehicle;

a second side frame provided on a second side of the motor compartment in the vehicle width direction, the second side frame including a second curved portion curved substantially upward from the lower front side of the vehicle cabin toward the front side of the vehicle body;

a unit frame provided between the first and second side frames to hold an electrical device including a plurality of electrical components housed in a unit case, the unit frame comprising:

a first longitudinal frame portion extending in a front-rear direction of the electric vehicle and provided on a first side of the electrical device in the vehicle width direction, the first longitudinal frame portion being secured to a first side portion of the electrical device;

a second longitudinal frame portion extending in the front-rear direction and provided on a second side of the electrical device in the vehicle width direction, the second longitudinal frame portion being secured to a second side portion of the electrical device, the second side portion of the electrical device being opposite to the first side portion of the electrical device in the vehicle width direction;

a first front side support leg downwardly extending from a front end portion of the first longitudinal frame portion, the first front side support leg being secured to the first side frame at a position located further forward than the first curved portion of the first side frame;

a second front side support leg downwardly extending from a front end portion of the second longitudinal frame portion, the second front side support leg being secured to the second side frame at a position located further forward than the second curved portion of the second side frame;

a rear frame portion extending in the vehicle width direction and disposed on a rear side of the electrical device, the rear frame portion including a substantially central area positioned higher than an upper surface of a rear edge portion of the electrical device;

a first rear side support leg downwardly extending from a first end portion of the rear frame portion and secured to the first side frame;

a second rear side support leg downwardly extending from a second end portion of the rear frame portion and secured to the second side frame, the second end portion of the rear frame portion being opposite to the first end portion of the rear frame portion in the vehicle width direction;

a first branch portion connecting a rear end portion of the first longitudinal frame portion to the first rear side support leg at a substantially middle area of the first rear side support leg in a top-bottom direction of the electric vehicle; and a second branch portion connecting a rear end portion of the second longitudinal frame portion to the second rear side support leg at a substantially middle area of the second rear side support leg in the top-bottom direction; and a bending inducing bracket provided in the substantially central area of the rear frame portion and protruding from the rear frame portion toward a rear of the electric vehicle, the bending inducing bracket being spaced apart from a wall member of the vehicle cabin in the front-rear direction, the bending inducing bracket being provided to come into contact with the wall member when an impact load is input from a front side of the electric vehicle.

2. The vehicle body front structure of the electric vehicle according to claim 1, wherein the unit frame further comprises
a front frame portion extending in the vehicle width direction and provided on a front side of the electrical device, the front frame portion including a first end and a second end, the first end of the front frame portion being connected to the first front side support leg, the second end of the front frame portion being connected to the second front side support leg, and wherein the electrical device is secured to only the front frame portion among the front frame portion and the rear frame portion.

3. The vehicle body front structure of the electric vehicle according to claim 1, wherein the bending inducing bracket diagonally upwardly protrudes from the rear frame portion toward the rear of the electric vehicle.

4. The vehicle body front structure of the electric vehicle according to claim 1, wherein the first rear side support leg is secured to the first side frame at a position closer to the first curved portion than the first front side support leg, and wherein the second rear side support leg is secured to the second side frame at a position closer to the second curved portion than the second front side support leg.

5. The vehicle body front structure of the electric vehicle according to claim 1, wherein the first longitudinal frame portion is downwardly inclined toward the wall member of the vehicle cabin along the front-rear direction, and wherein the second longitudinal frame portion is downwardly inclined toward the wall member of the vehicle cabin along the front-rear direction.

* * * * *